United States Patent
Roeland (10) Patent No.: US 9,848,399 B2
(45) Date of Patent: Dec. 19, 2017

(54) METHOD AND APPARATUS FOR SELECTING A GATEWAY NODE

(75) Inventor: Dinand Roeland, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 481 days.

(21) Appl. No.: 14/123,747

(22) PCT Filed: Jun. 1, 2012

(86) PCT No.: PCT/EP2012/060356
§ 371 (c)(1),
(2), (4) Date: Feb. 24, 2014

(87) PCT Pub. No.: WO2012/168146
PCT Pub. Date: Dec. 13, 2012

(65) Prior Publication Data
US 2014/0153559 A1 Jun. 5, 2014

Related U.S. Application Data

(60) Provisional application No. 61/494,049, filed on Jun. 7, 2011.

(51) Int. Cl.
*H04W 60/00* (2009.01)
*H04L 29/12* (2006.01)
(Continued)

(52) U.S. Cl.
CPC ......... *H04W 60/00* (2013.01); *H04L 61/1511* (2013.01); *H04L 61/304* (2013.01);
(Continued)

(58) Field of Classification Search
CPC ......... H04W 8/04; H04W 8/06; H04W 88/16; H04W 88/06; H04W 60/00; H04W 48/17;
(Continued)

(56) References Cited

U.S. PATENT DOCUMENTS

| 7,143,187 B1 * | 11/2006 | Takeda | H04L 29/06 370/912 |
| 7,933,260 B2 * | 4/2011 | Chaturvedi | H04L 45/00 370/352 |

(Continued)

OTHER PUBLICATIONS

"3GPP system—fixed broadband access network interworking; Stage 2," *3GPP TS 23.139, V12.0.0, Release 12*, http://3gpp.org/DynaReport/23139.htm, (Jun. 2013), 88 pages.
"Architecture enhancements for non-3GPP accesses," *3GPP TS 23.402, V10.3.0, Release 10*, http://www.3gpp.org/ftp/specs/html-info/23402.htm, (Mar. 2011), 229 pages.
(Continued)

*Primary Examiner* — Kwang B Yao
*Assistant Examiner* — Ricardo Castaneyra
(74) *Attorney, Agent, or Firm* — NDWE LLP (57) ABSTRACT

A method for selecting a gateway node for a terminal which connects to its registered domain via an access domain and, in a predetermined scenario, an intermediate domain, the access domain having an associated domain name system arranged to return an address of a gateway node based on a domain name system query. The method includes using a first part of such a query to identify the registered domain of the terminal to the domain name system and a second part of the query to indicate to the domain name system that it should use a predetermined mapping to return the address of a gateway node based on the query, the predetermined mapping being one which returns an address of a gateway node either in the registered domain or in an intermediate domain based on the registered domain identified in the query and on the access domain.

26 Claims, 4 Drawing Sheets

(51) Int. Cl.
  *H04W 8/06* (2009.01)
  *H04W 88/16* (2009.01)
  *H04W 48/00* (2009.01)

(52) U.S. Cl.
  CPC ........ *H04L 61/305* (2013.01); *H04L 61/3075* (2013.01); *H04W 8/06* (2013.01); *H04W 48/17* (2013.01); *H04W 88/16* (2013.01)

(58) Field of Classification Search
  CPC ........ H04W 8/26; H04W 8/12; H04W 92/02; H04W 76/022; H04L 61/1511; H04L 61/304; H04L 61/305; H04L 61/3075; H04L 29/12009; H04L 29/12367; H04L 63/10; H04L 29/12462; H04L 45/745
  See application file for complete search history.

(56) References Cited

U.S. PATENT DOCUMENTS

| | | | | |
|---|---|---|---|---|
| 2006/0039365 A1* | 2/2006 | Ravikumar | ............. | H04L 45/00 370/352 |
| 2006/0126584 A1* | 6/2006 | Zhang | ............... | H04L 29/12066 370/338 |
| 2009/0047947 A1* | 2/2009 | Giaretta | ................ | H04W 48/17 455/432.1 |
| 2010/0054222 A1 | 3/2010 | Rune | | |
| 2010/0150057 A1* | 6/2010 | Miklos | .................. | H04W 8/082 370/328 |
| 2010/0211628 A1* | 8/2010 | Shah | ..................... | H04W 48/17 709/203 |
| 2011/0261787 A1* | 10/2011 | Bachmann | ............ | H04L 63/029 370/331 |

OTHER PUBLICATIONS

"BBF WT-203: Interworking between Next Generation Fixed and 3GPP Wireless Access," *The Broadband Forum Working Text, Revision 8*, (May 2011), 53 pages.

"Conclusions for LOBSTER," *3GPP contribution TD S2-112755*, (May 16-20, 2011), 2 pages.

"ePDG in HPLMN for untrusted WLAN Reference architecture" *3GPP contribution TD S2-103510*, http://www.3gpp.org/ftp/tsg_sa/WG2_Arch/TSGS2_80_Brunstad/Docs/S2-103510.zip, (Aug. 30-Sep. 3, 2010), 11 pages.

"Key Issue—'Efficient usage of MSISDN resource for MTC,'" *3GPP contribution TD S2-112324*, (May 16-20, 2011), 1 page.

"Numbering, addressing and identification," *3GPP TS 23.003, V12.0.0, Release 12*, http://www.3gpp.org/ftp/specs/html-info/23003.htm, (Sep. 2013), 84 pages.

"PCT Notification of Transmittal of the International Search Report and the Written Opinion of the International Searching Authority," for PCT Counterpart Application No. PCT/EP2012/060356, dated Sep. 14, 2012, 9 pages.

"Study on S2a Mobility based on GPRS Tunnelling Protocol (GTP) and Wireless Local Area Network (WLAN) access to the Enhanced Packet Core (EPC) network (SaMOG); Stage 2," *3GPP TR 23.852, V2.0.0, Release 12*, http://3gpp.org/DynaReport/23852.htm, (Sep. 2013), 156 pages.

"Study on support of Broadband Forum (BBF) access interworking," *3GPP TR 23.839, V12.0.0, Release 12*, http://3gpp.org/DynaReport/23839.htm, (Jun. 2013), 179 pages.

International Preliminary Report on Patentability, Application No. PCT/EP2012/060356, dated Dec. 27, 2013, 6 pages.

Communication under rule 94(3) for European Application No. 12725401.9, dated May 25, 2016, 4 pages.

* cited by examiner

FIG. 3 local-epdg.epc.mnc<x>.mcc<y>.pub.3gppnetwork.org

METHOD AND APPARATUS FOR SELECTING A GATEWAY NODE

CROSS-REFERENCE TO RELATED APPLICATIONS

This application is a National stage of International Application No. PCT/EP2012/060356, filed Jun. 1, 2012, which claims priority to U.S. Application No. 61/494,049, filed Jun. 7, 2011, which are hereby incorporated by reference.

TECHNICAL FIELD

The present invention relates to selection of a gateway node in a telecommunications network.

BACKGROUND

An ongoing trend within telecommunications is the convergence of fixed and mobile networks, which is known as Fixed Mobile Convergence (FMC). The trend of evolving networks using IP-based technologies is common for fixed and mobile networks, which makes the convergence easier. By FMC, mobile and fixed network operators will be able to utilize their network resource more efficiently, which leads to reduction of capital and operational expenditure (CAPEX and OPEX). For instance, when a user is running an IP-based application such as Multimedia Telephony (MMTel) inside their home, it is more efficient to utilize broadband connectivity of the fixed access network rather than the wireless access network.

Residential networks have been important to the success of FMC because they are the most commonly used fixed network access by ordinary users. Therefore, it is important to be able to connect mobile phones to the Evolved Packet Core (EPC; see "Architecture enhancements for non-3GPP Accesses," 3GPP TS 23.402, V10.3.0, 2011-03; http://www.3gpp.org/ftp/specs/html-info/23402.htm) through a residential network. The term User Equipment (UE) can be used in place of the term mobile terminal or mobile phone. The term UE is familiar in the 3rd Generation Partnership Project (3GPP) documentation, and is intended to refer to any piece of equipment that is configured to access the internet; it would include, for example and without limitation, mobile telecommunication devices, portable or hand-held computing devices and desktop or installed computers.

3GPP (3rd Generation Partnership Project) defines mobile 2G/3G/LTE accesses and "non-3GPP accesses" (TS 23.402). The latter can be a fixed network. Many UEs address the FMC trend by providing multiple radio interfaces: one interface to connect to a 2G/3G/LTE access and a WiFi interface to connect to a fixed network. The BBF (BroadBand Forum, the standardization organization for the fixed access; see http://www.broadband-forum.org/) defines an architecture for fixed networks. There is an ongoing joint work item on FMC between these two organizations [3GPP TR 23.839, now moving into TS 23.139, and BBF WT 203].

There are a number of ongoing work items on Fixed Mobile Convergence (FMC). In FMC, a dual-radio UE is generally assumed. The UE has one radio interface for the 3GPP access (e.g. LTE), and one radio interface for the fixed access (e.g. WiFi). In 3GPP, "Study on Support of BBF Access Interworking" (BBAI) covers interworking between 3GPP (the standardization organization for mobile networks) and BBF (the standardization organization for fixed networks) [3GPP TR 23.839, TS 23.139, BBF WT 203]. Another work item in 3GPP, "Study on S2a Mobility based On GTP & WLAN access to EPC" (SaMOG) covers the standardization of a 3GPP network interworking with a WiFi radio access [3GPP TS 23.852]. Additional standardization activities are ongoing in the WiFi Alliance.

In the WiFi Alliance, one of the focus areas is (public) hotspots. Therefore, in addition to the residential networks described above, hotspots are increasingly becoming key to the success of FMC, and there is a work item in 3GPP called SaMOG (Study on S2a mobility based on GTP & WLAN access to EPC; see 3GPP TR 23.852 at http://www.3gpp.org/ftp/Specs/html-info/23852.htm). SaMOG is specific to S2a, but not specific to BBF.

A 3GPP UE can attach to a non-3GPP access network (e.g. a fixed network) and connect to one or more Packet Data Networks (PDNs) via the S2 interface [3GPP TS 23.402]. The S2 interface comes in three types: S2a, S2b and S2c. In S2a, the non-3GPP access network is seen as trusted; the non-3GPP access network is therefore denoted as TNAN (Trusted Non-3GPP Access Network). Where the TNAN uses Wireless LAN (WLAN) as the radio technology towards the UEs, the TNAN is denoted as TWAN (Trusted WLAN Access Network). A TWAN would typically comprise a Residential Gateway (RG), an Access Node and a gateway node denoted as a TWAN Access Gateway (TWAG).

Figure 1:
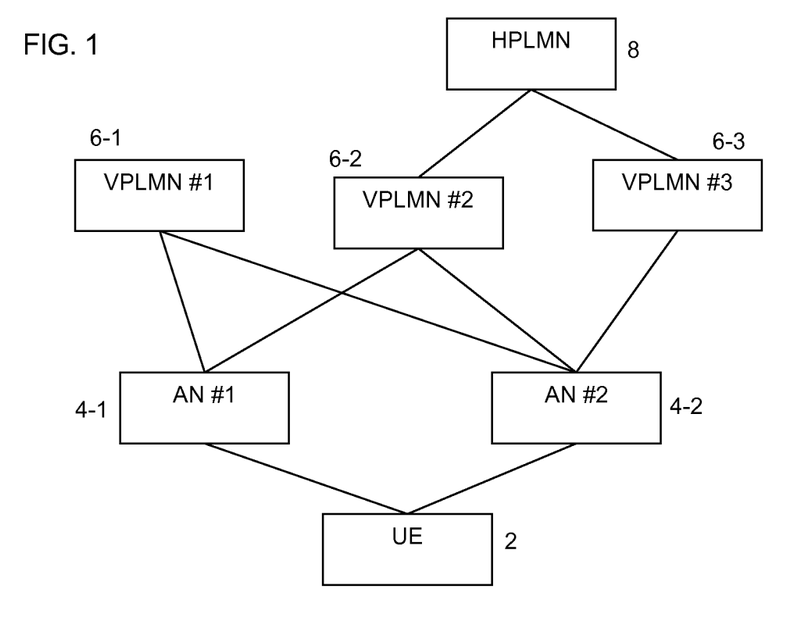
FIG. 1, discussed hereinbefore, is a schematic illustration of a roaming scenario in which a UE connects to its HPLMN via an AN and VPLMN.

FIG. 1 of the accompanying drawings is a schematic illustration of a roaming scenario, in which a UE 2 connects to its Home PLMN (HPLMN) 8 via an Access Network (AN) 4-1 and a Visited PLMN (VPLMN) 6-2, where PLMN stands for Public Land Mobile Network. As illustrated in FIG. 1, a HPLMN might have roaming agreements with several VPLMNs, and a VPLMN can have operating agreements with several AN domains, and vice versa. For example, in FIG. 1, the HPLMN 8 has a roaming agreement with VPLMN 6-2 and VPLMN 6-3; VPLMN 6-1 and VPLMN 6-2 each have an operating agreement with AN 4-1 and AN 4-2, while VPLMN 6-3 has an operating agreement with AN 4-2. In some scenarios, the AN and VPLMN are, or can be considered to be, the same. One example where the VPLMN and AN can be different domains is the above-mentioned FMC (reference architectures for FMC scenarios are listed in TR 23.839, which can be found at http://www.3gpp.org/ftp/specs/html-info/23839.htm). In such a scenario, an example of the AN is the above-mentioned BBF domain.

One technical challenge which has previously been identified in this context is that of finding an appropriate ePDG (evolved Packet Data Gateway) for the UE where the UE is able to roam, such that the UE may connect to its HPLMN directly or via an intermediate VPLMN depending on where the UE is located.

TS 23.402 explains (see section 4.3.4) the functionality of an ePDG (evolved Packet Data Gateway); the main function of the ePDG is to secure the data transmission with a UE connected to the EPC over an untrusted non-3GPP access, acting as a termination node of IPsec tunnels established with the UE.

TS 23.402 also defines (see section 4.5.4) how a UE finds the ePDG (evolved Packet Data Gateway). In a roaming scenario, the UE constructs an FQDN (Fully Qualified Domain Name) using the VPLMN ID.

In this respect, creation of the FQDN is as set out in TS 23.003 (http://www.3gpp.org/ftp/specs/html-info/23003.htm). The FQDN is of the format "epdg.epc.mnc<MNC>.mcc<MCC>.pub.3gppnetwork.org", where the Mobile Country Code (MCC) and the Mobile Network Code (MNC) are obtained or derived from the PLMN ID. For example, where the PLMN ID indicates that MCC=234 and MNC=15, then the FQDN would be constructed as epdg.epc.mnc015.mcc234.pub.3gppnetwork.org.

Following construction of the FQDN, the UE selects an ePDG IP address (IP@) from the list returned in the Domain Name System (DNS) response and initiates the IPsec tunnel establishment. If the VPLMN ID is unknown, the UE constructs an FQDN using the HPLMN ID.

More specifically, TS 23.402 explains that the UE may select the ePDG by static configuration or dynamically. If a selected ePDG is not reachable from an untrusted non-3GPP access the UE repeats the ePDG selection and selects a different ePDG if available.

TS 23.402 goes on to explain that, if the ePDG needs to be dynamically selected when the UE roams in a VPLMN whose VPLMN ID is known by the UE, the procedure is as follows:

The UE constructs an FQDN using the VPLMN ID as the Operator Identifier and employs the DNS server function to obtain the IP address(es) of the ePDG(s) in the VPLMN.

The UE selects an ePDG address from the list returned in the DNS response and initiates the IPsec tunnel establishment.

Otherwise, as TS 23.402 explains, if the ePDG needs to be dynamically selected the procedure is as follows:

The UE constructs an FQDN using the HPLMN ID and employs the DNS server function to obtain the IP address(es) of the ePDG(s).

The UE selects an ePDG address from the list returned in the DNS response and initiates the IPsec tunnel establishment.

The present applicant has appreciated the following issues with the presently defined techniques.

In certain roaming scenarios (for example, an FMC scenario as referred to above), the UE has no standardized means to discover the VPLMN ID. Therefore, there will be cases where only the HPLMN ID is known to the user.

3GPP contribution TS S2-103510 (available at http://www.3gpp.org/ftp/tsg_sa/WG2_Arch/TSGS2_80_Brunstad/Docs/S2-103510.zip) proposes to allow the UE to contact the H-ePDG (Home ePDG) directly, also in roaming scenarios. This is an addition to the existing FMC reference architectures in TS 23.839.

For roaming scenarios TS S2-103510 proposes: "If the UE selects the ePDG that belongs to HPLMN the traffic is routed to the HPLMN via the SWu/SWn interface. According to the IP routing implemented the SWu/SWn may not traverse the VPLMN. The S9* session may be established via V-PCRF or directly between the H-PCRF and the BPCF, if allowed by agreement between the parties and the network configuration".

The solution proposed in TS S2-103510 allows the traffic to bypass the VPLMN completely—the Internet becomes the transport network between the BBF domain and the HPLMN. The roaming scenario basically becomes a non-roaming scenario. In some cases, this might be what the operator wants. However, it is desirable that a solution is also available where the traffic really is routed via a VPLMN.

Another previously-considered solution is based on DNS: the UE can construct the FQDN with its location, e.g. the Routing Area Identity/Tracking Area Identity (RAI/TAI) in 3GPP Access. The result of the ePDG FQDN would be: "UE-location.epdg.epc.mnc<MNC>.mcc<MCC>.pub.3gppnetwork.org".

However, the RAI/TAI might not be available to the UE, for example if there is no 3GPP RAN (Radio Access Network) coverage (but only e.g. WLAN or Wireless LAN coverage as in a FMC scenario). Another means for the UE to indicate its location might be SSID (Service Set ID), but that would lead to a lot of administration for the operator. Also, SSIDs might be set by the owner of the residential network—and therefore not known to the operator.

The above-described issues are of course not limited to finding an ePDG in the specific context described above with reference to FIG. 1, but apply to any situation in which a terminal connects to its registered domain (or home domain) via an access domain and possibly an intermediate domain between the access domain and the registered domain, and where the terminal is attempting to find a gateway node (or indeed any other type of node) that is most appropriate or desirable (e.g. from a geographical and/or network efficiency point of view)—whether that gateway node be located in an intermediate domain or in the registered domain.

Figure 2:
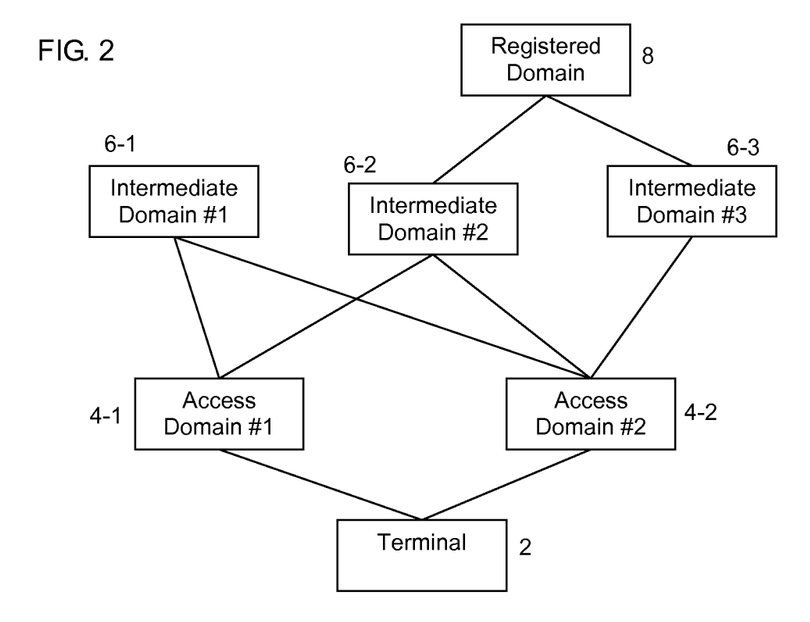
FIG. 2, discussed hereinbefore, is a schematic illustration equivalent to FIG. 1, depicting a situation in which a terminal connects to its registered domain via an access domain and possibly an intermediate domain between the access domain and the registered domain.

FIG. 2 is a schematic illustration of this wider context, and it can readily be seen that it is entirely equivalent to that of FIG. 1. The HPLMN 8 can be considered to be the "registered domain" for the UE 2, i.e. the domain at which the UE 2 is registered (for example the domain in which the user's profile is maintained and/or which is responsible for charging for services consumed by the user). The ANs 4-1 and 4-2 can be considered to be "access domains", and the UE 2 can be referred to as a "terminal". The VPLMNs 6-1 to 6-3 can be considered to be "intermediate domains".

The technical problem as appreciated by the present applicant can therefore be summarized as one of identifying an appropriate gateway node for a terminal which connects to its registered domain (e.g. home domain) via an access domain and, in a predetermined scenario (e.g. a roaming scenario), an intermediate domain (e.g. a visited domain), particularly where the terminal does not have knowledge of its own location and cannot therefore pass this information on for assistance in selecting an appropriate gateway node. It is desirable to find a solution to this technical problem.

SUMMARY

A method is proposed of selecting a gateway node for a terminal which connects to its registered domain via an access domain and, in a predetermined scenario, an intermediate domain. The access domain has an associated domain name system which is adapted and/or arranged and/or operable to return an address of a gateway node based on a domain name system query sent to it. The method involves using a first part of such a domain name system query to identify the registered domain of the terminal to the domain name system and a second part of the domain name system query to indicate to the domain name system that it should use a predetermined mapping to return the address of a gateway node based on the domain name system query. The predetermined mapping is one which returns an address of a gateway node based on the access domain and the identified registered domain. The gateway node is either in the registered domain or in an intermediate domain.

An apparatus is also proposed for selecting a gateway node for a terminal which connects to its registered domain via an access domain and, in a predetermined scenario, an intermediate domain. The access domain has an associated domain name system which is adapted and/or arranged and/or operable to return an address of a gateway node based on a domain name system query sent to it. The apparatus comprises means for using (or at least one component adapted or arranged to use) a first part of such a domain name system query to identify the registered domain of the terminal to the domain name system and a second part of the domain name system query to indicate to the domain name system that it should use a predetermined mapping to return the address of a gateway node based on the domain name system query. The predetermined mapping is one which returns an address of a gateway node based on the access domain and the identified registered domain. The gateway node is either in the registered domain or in an intermediate domain.

The predetermined mapping may specify the preferred gateway node for various combinations of access domain and registered domain. The mapping may be used to look up the preferred gateway based on the combination of the access domain and the identified registered domain. The predetermined mapping may take the form of a lookup table.

The predetermined mapping need not specify the preferred gateway node for every possible combination of access domain and registered domain, it merely being necessary to specify the preferred gateway node for at least some of these combinations. It may be that a default choice of gateway node is used for any combination not explicitly included in the predetermined mapping.

The preferred gateway node for a particular combination of access domain and registered domain may depend on proximity. For example, the gateway node that is not only available to the access domain and registered domain but also geographically closest to the access domain may be designated as the preferred gateway node. Alternatively, the gateway node that is geographically closest to the registered domain may be designated as the preferred gateway node.

The preferred gateway node for a particular combination of access domain and registered domain may depend on routing cost. For example, the gateway node that is not only available to the access domain and registered domain but also which would result in the lowest routing cost according to a predetermined measure may be designated as the preferred gateway node.

The preferred gateway node for a particular combination of access domain and registered domain may depend on an operating agreement between two or more of the access domain, the registered domain and the intermediate domain in which the gateway node is located.

The preferred gateway for a particular combination of access domain and registered domain may depend on whether the access domain is associated with the identified registered domain.

The predetermined mapping may be one which, when the domain name system is associated with an access domain that is not itself associated with the identified registered domain, returns an address of a gateway node in an intermediate domain which has an operating agreement with both the access domain and the identified registered domain, and which, when the domain name system is associated with an access domain that is itself associated with the registered domain, returns an address of a gateway node in the registered domain.

The predetermined mapping is, as mentioned above, one which returns an address of a gateway node based on the access domain and the registered domain. As mentioned above, the registered domain to be used to determine the gateway node address is identified in the second part of the domain name system query. The access domain to be used to determine the gateway node address may be determined in various ways; since the domain name query would generally be received from the access domain, the access domain may be identified as that from which the query was received, e.g. based on the source address of the domain name system query; or the access domain could be specified more explicitly in a separate part of the domain name system query.

The terminal need not be an end-host but may be any node, and may even be another gateway node.

The registered domain may be a home domain.

The predetermined scenario may be a roaming scenario.

The intermediate domain may be a visited domain.

The method is applicable to a mobile network architecture or a fixed network architecture, or a combination of these (e.g. as described in relation to FMC above). Therefore, each of the registered domain, intermediate domain and access domain may relate to a mobile network or a fixed network, in any combination.

The access domain can be considered as being associated with the identified registered domain if it is in or forms part of the identified registered domain.

The domain name system can be considered as being associated with the access domain if it is in or forms part of the access domain. The domain name system may be able to determine the access domain to be used The predetermined mapping may be provided or configured at the domain name system, or it may be provided or configured at a server remote from the domain name system and accessed remotely by the domain name system.

The domain name system query may comprise a Fully Qualified Domain Name, FQDN.

The registered domain may comprise an HPLMN.

The intermediate domain may comprise a VPLMN.

The terminal may comprise a UE.

The first part of the domain name system query may comprise more than one element, which elements may be non-adjacent.

The first part of the domain name system query may comprise a Mobile Country Code, MCC, element and a Mobile Network Code, MNC, element. The MCC and MNC may be derived from the PLMN ID of the HPLMN. The first part may comprise one or more descriptive elements which describe one or more related elements in the first part, such as "mcc" before the MCC element and "mnc" before the MNC element.

The access domain can be assumed as knowing via which intermediate domain to route traffic to a given registered domain. This knowledge may be based on operating agreements between the access domain, intermediate domains and registered domains.

The access domain can be considered as having its own domain name system, or as having access to or being associated with such a domain name system.

The second part of the domain name system query may be considered as effectively requesting the domain name system to return an address for "my local gateway node", which would be in an intermediate domain in the predetermined scenario and otherwise in the registered domain.

The second part may comprise a textual indication. As one example, such a textual indication may be "local" or "local-".

The gateway node may be a Packet Data Network, PDN, Gateway, PGW, node.

The gateway node may be an evolved Packet Data Gateway, ePDG, node.

The domain name system query may comprise a third part identifying a type of the gateway node (e.g. ePDG or PGW).

The third part may comprise a textual indication, such as "epdg" for an ePDG and "pgw" for a PGW.

As one example, a combination of the second and third parts may be "local-epdg".

The third part may be considered as being part of the second part.

The domain name system query may comprise a fourth part identifying aspects of the network environment, for example whether an Evolved Packet Core, EPC, and/or a 3rd Generation Partnership Project, 3GPP, network is involved.

For example, when used with an Evolved Packet Core, EPC, in a 3rd Generation Partnership Project, 3GPP, network, and where the domain name system query comprises an FQDN, and where the first part of the domain name system query comprises an MCC of <x> and an MNC of <y>, and where a combination of the second and third parts is "local-epdg", the FQDN may be of the form "local-epdg.epc.mnc<x>.mcc<y>.pub.3gppnetwork.org".

Figure 3:
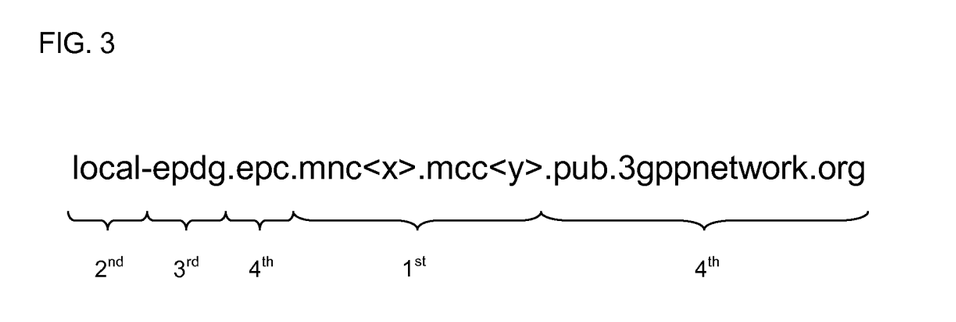
FIG. 3, discussed hereinbefore, is an illustration of the parts making up an example FQDN in an embodiment of the present invention.

More generally, the FQDN may be of the form of a combination of the first, second, third and fourth parts, in any order, and with the various parts containing one or more elements which may or may not be adjacent in order. These parts are illustrated in FIG. 3 of the accompanying drawings in relation to a specific example.

The predetermined mapping may be integrated into the remainder of the domain system's lookup database, rather than being a separate mapping which is only used if it is determined in a separate step, and based on the second part of the domain name system query, that the predetermined mapping should be used. For example, the domain name system query may itself simply be used as a key into a lookup database, in an attempt to find a matching entry, without any special processing being required by the domain name system to deconstruct the domain name system query. The lookup database is populated with appropriate entries to provide the predetermined mapping as part of the database. In such an example, the second part of the domain name system query indicates to the domain name system that it should use the predetermined mapping to the extent that it acts as a key into that part of the lookup database having the predetermined mapping; with a different second part the query may return entries from other parts of the lookup database that do not conform to the predetermined mapping.

The address returned by the domain name system may be an IP address. However, the address may instead be in a form that requires another lookup to be performed in order to obtain the IP address; for example it may be in the form of an FQDN which is used to look up the IP address in the or another domain name system.

A method as described above may be preceded by a step which involves using a domain name system query which identifies the intermediate domain of the terminal to the domain name system, with the domain name system endeavoring to return an address of a gateway node in the intermediate domain.

A method as described above may be followed by a step which involves using a domain name system query which identifies the registered domain of the terminal to the domain name system, with the domain name system endeavoring to return an address of a gateway node in the registered domain.

When used with an Evolved Packet Core, EPC, in a 3rd Generation Partnership Project, 3GPP, network, and where the domain name system query comprises an FQDN, the reply of the DNS server depends on the roaming scenario: in a non-roaming case, the DNS server simply replies the IP@/FQDN of the H-ePDG. In a roaming case, the DNS server resolves which V-ePDG (Visited ePDG) to use, based on the known roaming agreements between HPLMN and VPLMNs. It then replies the IP@/FQDN of that V-ePDG.

An advantage of such a solution is that the UE can find the correct peering nodes in a visited network in order to gain access to EPC, without having to specify its proximity, and without having to know anything about the network it attaches to. The solution gives full control to the operator on how to route traffic.

More generally, an advantage of a solution proposed herein is that it enables the identification and/or selection of an appropriate gateway node for a terminal which connects to its registered domain via an access domain and, in a predetermined scenario, an intermediate domain, even where the terminal does not know its own location.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

DETAILED DESCRIPTION

A first embodiment of the present invention relates to the scenario described above with reference to FIG. 1 in which an appropriate ePDG (evolved Packet Data Gateway) is sought for a UE where the UE is able to roam, such that the UE may connect to its HPLMN directly or via an intermediate VPLMN depending on where the UE is located. In the first embodiment, the UE finds the correct ePDG based on three possible DNS queries. These are executed in the following order:

(1) If the UE knows the VPLMN ID, an FQDN for the ePDG is constructed based on that.
(2) If the UE does not know the VPLMN ID, an FQDN for a "local ePDG" is constructed.
(3) If no ePDG is found in either step (1) or (2), the UE construct an FQDN for the ePDG based on the HPLMN ID.

Steps (1) and (3) are already part of TS 23.402. Step (2) is mainly what differentiates this embodiment of the present invention from TS 23.402. It is possible that one or both of steps (1) and (3) can be omitted, leaving just step (2).

For step (2), the UE constructs an FQDN of the form "local-epdg.epc.mnc<x>.mcc<y>.pub.3gppnetwork.org", where x and y are taken or derived from the UE's HPLMN ID. An FQDN prefix element other than "local-epdg" can of course be used, so long as its meaning would be clear to all relevant nodes.

For example, consider the following scenario:
Visited PLMN ID (VPLMID):
  MCC=16
  MNC=345
Home PLMN ID (HPLMID):
  MCC=42
  MNC=749 The following FQDNs would be constructed in each of the above three steps:
(1) epdg.epc.mnc016.mcc345.pub.3gppnetwork.org
(2) local-epdg.epc.mnc042.mcc749.pub.3gppnetwork.org
(3) epdg.epc.mnc042.mcc749.pub.3gppnetwork.org The FDQN is used in the DNS query sent by the UE. The UE uses the DNS server it received from the DHCP server, when it attached to the network and applied for an IP address.

In this embodiment it is assumed that the AN domain has its own DNS server. The AN domain now adds entries to its DNS server mapping HPLMN IDs to VPLMN ePDGs.

In order to generate correct DNS entries, the AN domain needs to know via which VPLMN to route traffic to a given HPLMN. This knowledge is based on roaming and operating agreements between the AN domain, VPLMNs and HPLMNs.

By way of example, say that the UE's home operator is Operator_H. Operator_H has roaming agreements with Operator_V1 and Operator_V2. The UE is attached via WiFi to an AN domain called SF_Fixed. SF_Fixed has operating agreements with Operator_V1, Operator_V2 and SF_Wireless. Then SF_Fixed is aware that traffic for Operator_H UEs needs to be routed via either Operator_V1 or Operator_V2—and not via SF_Wireless. Now let the PLMN ID for Operator_H be (MNC=x, MCC=y). The following mapping entries are added in the DNS server of SF_Fixed:
  "local-epdg.epc.mnc<x>.mcc<y>.pub.3gppnetwork.org"→IP@Operator_V1's ePDG
  "local-epdg.epc.mnc<x>.mcc<y>.pub.3gppnetwork.org"→IP@Operator_V2's ePDG The example above describes the roaming scenario. In a non-roaming scenario, the procedure would be as follows.

The UE attaches via WiFi to one of Operator_H's own hotspots. DNS queries made in that hotspot are handled by a DNS server in an AN of Operator_H. The following mapping entries are added in that DNS server. Also here, the PLMN ID of Operator_H is (MNC=x, MCC=y):
  "local-epdg.epc.mnc<x>.mcc<y>.pub.3gppnetwork.org"→@IP Operator_H's ePDG Note that, in such non-roaming case, it is not necessary to add entries for the local ePDG. As the UE would default to generating an FQDN based on its HPLMN ID (step 3, see above).

Note that the DNS server can either reply IP@ of the V-ePDG directly (as indicated in the example above), or reply with the FQDN of the V-ePDG. The UE would then need to resolve that FQDN to an IP@ by a subsequent DNS query. (This can be avoided if the V-ePDG records are automatically included by the DNS server in the ADDITIONAL section as is common practice.)

An advantage of the solution described here is that it gives the operators full control of how traffic is routed.

The first embodiment describes how to find the correct ePDG. The same or an equivalent solution can be used to find other peering or gateway nodes in the EPC network. For example, the same or an equivalent solution can be used to find a PDN (Packet Data Network) GateWay (PGW) in an S2c scenario (as an alternative or in addition to what is described in section 4.5.2 of TS 23.402); a PGW provides connectivity from the UE to external packet data networks by being the point of exit and entry of traffic for the UE.

The present invention is also applicable in contexts other than that described above in relation to the first embodiment, which is based on the scenario shown in FIG. 1. In this respect, second and third embodiments will be described briefly below with reference to FIGS. 4(b) and 4(c), with the first embodiment being shown in FIG. 4(a) for ease of reference. The second and third embodiments are based on the scenario as shown in FIG. 2. Since the second and third embodiments are equivalent to the first embodiment, differing mainly in terminology, a detailed description thereof is not required.

Figure 4A:
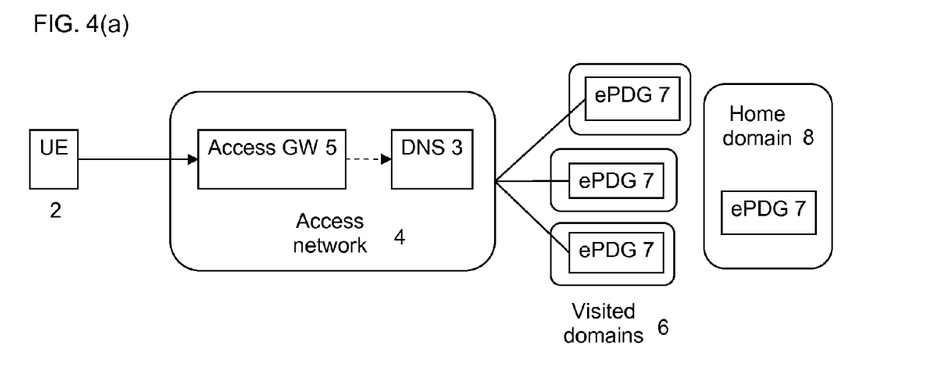
FIG. 4(a) is an alternative schematic representation of FIG. 1, a context in which a first embodiment of the present invention is set.
Figure 4B:
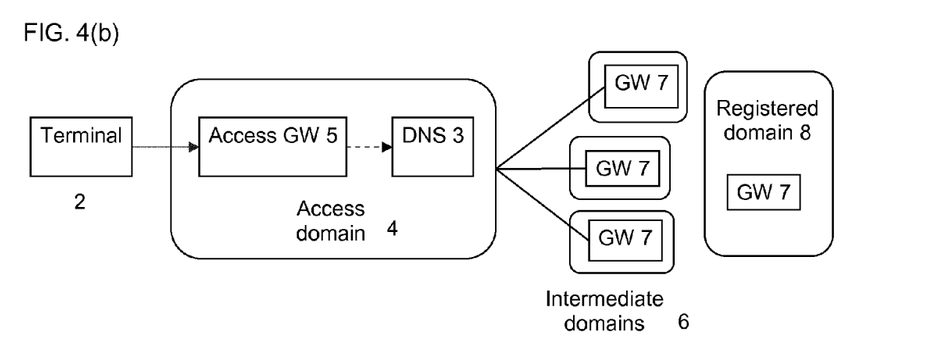
FIG. 4(b) is a schematic representation of a context in which a second embodiment of the present invention is set.

The second embodiment illustrated schematically in FIG. 4(b) is typically applicable where a large operator has several WLAN access domains 4, and several intermediate or regional domains 6. The access GW 5 in the depicted access domain 4 could be an S2a TWAG. In this example, each intermediate domain 6 has a respective gateway (GW) node 7. The terminal 2 is associated with an access GW 5. The access GW 5 provides routing towards a GW 7; there could be several access GWs 5 within the access domain 4.

The access GW 5 sends a query to the DNS 3 in the form of "my-gw.x.abc", where "x" identifies the domain the terminal 2 is registered at (the registered domain 8), and where "my-gw" is merely an example of a textual indication used to identify what is being asked for: i.e. the preferred gateway node, whether that gateway node be in an intermediate domain 6 or in the registered domain 8 or elsewhere.

In this embodiment the DNS 3 is in the access domain 4, and is configured with information (specific to that access domain 4) concerning which gateway is preferred for which registered domain 8. The preferred gateway for a particular combination of access domain 4 and registered domain 8 may be in an intermediate domain 6 (i.e. one of gateway nodes 7) or in the registered domain 8; it may even can be within the access domain 4. Preference could be based e.g. on proximity, routing cost, operating agreements, and so on.

It can be seen from a comparison between the first embodiment depicted in FIG. 4(a) and the second embodiment depicted in FIG. 4(b) that the two embodiments are equivalent, differing almost entirely in terminology. Whilst it is described above that, in the first embodiment, the DNS query sent to the DNS 3 comes from the UE, whereas the FIG. 4(a) representation of the first embodiment would appear to differ in that the DNS query would appear to come from the access GW 5, in fact the two are in practice equivalent because the access GW is implicit in the previous description and the DNS query in both originates from the UE.

Figure 4C:
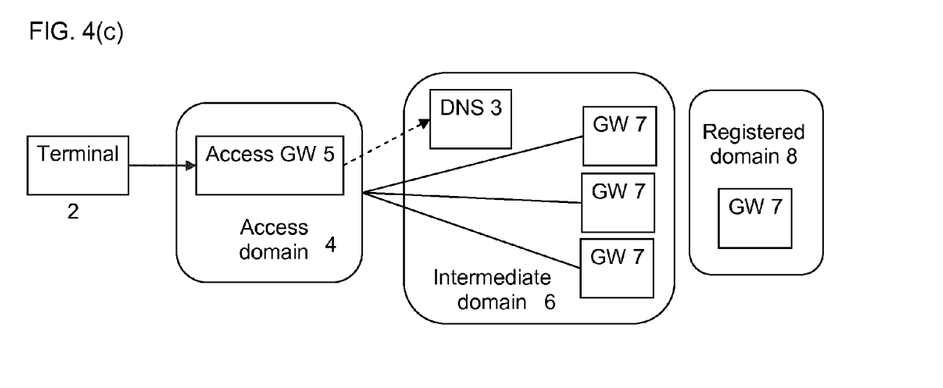
FIG. 4(c) is a schematic representation of a context in which a third embodiment of the present invention is set.

In the third embodiment, illustrated schematically in FIG. 4(c), the access GW 5 in the access domain 4 could again be an S2a TWAG. The intermediate domain 6 is from the same operator as the access domain 4. In this embodiment, the DNS 3 is in the intermediate domain 6, unlike in the first and second embodiments where the DNS 3 is in the access domain 4. However, since the intermediate domain 6 is under control of the same operator as the access domain 4, the DNS 3 can be considered to be associated with the access domain 4 (although this association between the DNS 3 and the access domain 4 can be present for other reasons). In order for DNS 3 to make a decision, it would typically take into account the access GW 5 that is asking sending on the DNS query; this could be by way of including information relating to the access GW 5 in the DNS query, e.g. a location or ID of the access GW 5 or the IP address of the access GW 5.

Similar to the second embodiment, in the third embodiment the terminal 2 is associated with the access GW 5. The access GW 5 provides routing towards a GW. In this embodiment, the access GW 5 sends a query in the form of "local-gw.x.abc", where "x" identifies the terminal's registered domain 8, and where "local-gw" is merely an example of a textual indication to identify what is being asked for (as per the second embodiment). As before, the DNS 3 in the intermediate domain 6 is configured with information on which gateway is preferred for which registered domain, with preference being based e.g. on proximity, routing cost, operating agreements, and so on.

In all three of the above-described embodiments, a method is described of selecting a gateway node 7 for a terminal 2 which connects to its registered domain 8 via an access domain 4 and, in a predetermined scenario, an intermediate domain 6. The access domain 4 has an associated domain name system 3 which is adapted and/or arranged and/or operable to return an address of a gateway node 7 based on a domain name system query sent to it. The method involves using a first part of such a domain name system query to identify the registered domain 8 of the terminal 2 to the domain name system 3 and a second part of the domain name system query to indicate to the domain name system 3 that it should use a predetermined mapping to return the address of a gateway node 7 based on the domain name system query. The predetermined mapping is one which returns an address of a gateway node 7 based on the access domain 4 and the identified registered domain 8. The gateway node 7 is either in the registered domain 8 or in an intermediate domain 6. For example, the predetermined mapping may be one which, when the domain name system 3 is associated with an access domain 4 that is not itself associated with the identified registered domain 8, returns an address of a gateway node 7 in an intermediate domain 6 which has an operating agreement with both the access domain 4 and the identified registered domain 8, and which, when the domain name system 3 is associated with an access domain 4 that is itself associated with the registered domain 8, returns an address of a gateway node 7 in the registered domain 8.

Such a method can be considered as being carried out separately at the domain name system 3 and at the terminal 2.

When carried out at the terminal 2, the method may be considered as comprising the steps of (S1) constructing a domain name system query as described above; (S2) sending the domain name system query to the domain name system 3; and (S6) receiving the address from the domain name system 3. These steps are illustrated schematically in FIG. 5. These steps can be considered as "using" the first and second parts of the domain name system query in the manner described above.

When carried out at the domain name system 3, the method may be considered as comprising the steps of (S3) receiving the domain name system query as described above from the terminal 2; (S4) looking up the address of a gateway node 7 based on the received domain name system query; and (S5) sending the address to the terminal 2. These steps are illustrated schematically in FIG. 5. These steps can be considered as "using" the first and second parts of the domain name system query in the manner described above.

Figure 5:
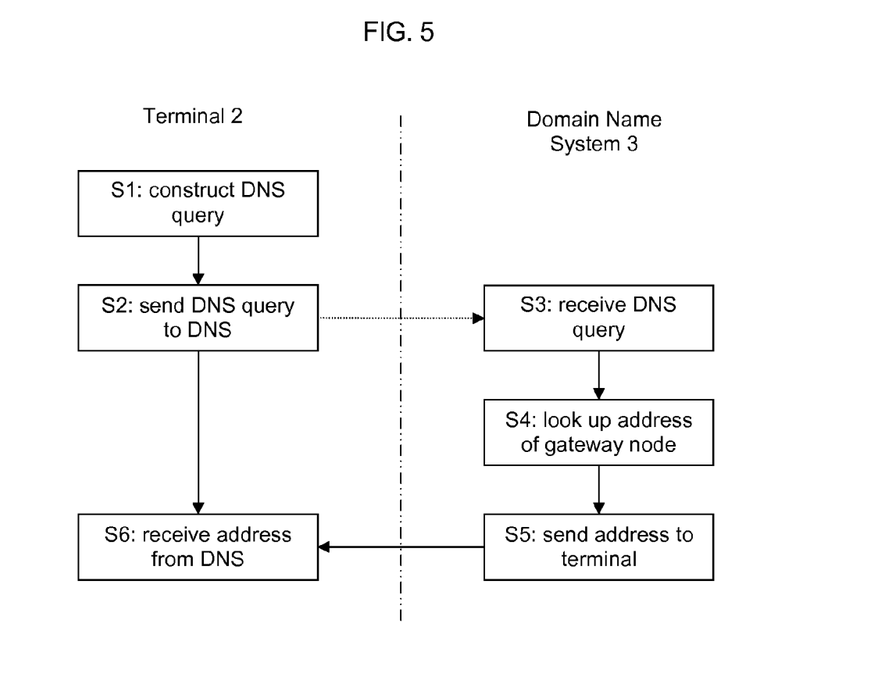
FIG. 5 is a schematic flow chart illustrating a method performed by nodes in an embodiment of the present invention.
Figure 6:
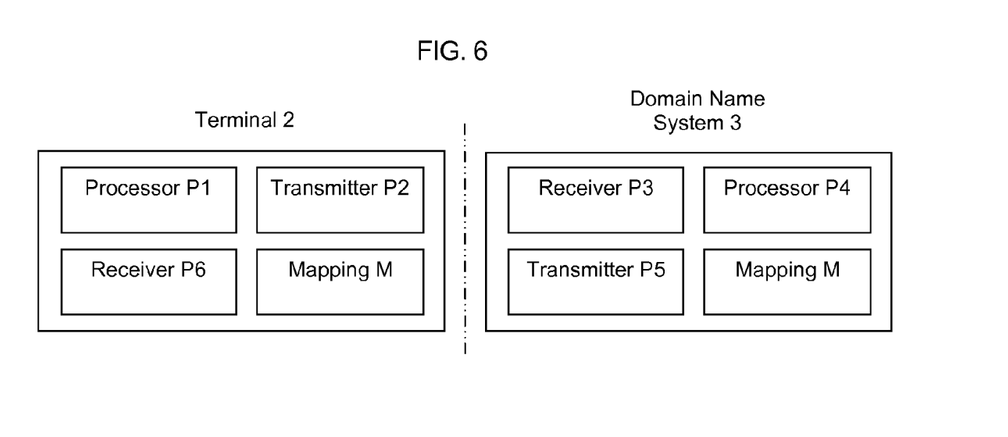
FIG. 6 is a schematic block diagram illustrating apparatus for performing a method embodying the present invention.

FIG. 6 of the accompanying drawings is a schematic block diagram illustrating apparatus for use to perform the method of FIG. 5. For each of the functional block of FIG. 5, there is a corresponding processing unit illustrated in FIG. 6 for performing the function represented by that functional block; like reference numerals have been applied, so that for example processing unit P1 is provided for performing the function of step S1. Also illustrated is the mapping M that is used during performance of the method.

Such an apparatus can be considered as being for selecting a gateway node 7 for a terminal 2 which connects to its registered (e.g. home) domain 8 via an access domain 4 and, in a predetermined (e.g. roaming) scenario, an intermediate (e.g. visited) domain 6. The access domain 4 has an associated domain name system 3 which is adapted and/or arranged and/or operable to return an address of a gateway node 7 based on a domain name system query sent to it. The apparatus comprises means for using (or at least one component adapted to use) a first part of such a domain name system query to identify the registered domain 8 of the terminal 2 to the domain name system 3 and a second part of the domain name system query to indicate to the domain name system 3 that it should use a predetermined mapping to return the address of a gateway node 7 based on the domain name system query. The predetermined mapping is one which returns an address of a gateway node 7 based on the access domain 4 and the identified registered domain 8. The gateway node 7 is either in the registered domain 8 or in an intermediate domain 6.

Such an apparatus can be considered as being provided separately at the domain name system 3 and at the terminal 2.

A specific example of the mapping M was described above in relation to the first embodiment. As described above, the mapping is generally one which receives the access domain and the registered domain and returns an address of an appropriate gateway node based on those inputs, with the gateway node either being in the registered domain or in one of the intermediate domains. The following is a more general example of an excerpt from a mapping:

| Registered Domain | Access Domain | Gateway Node (Intermediate Domain) |
|---|---|---|
| ... | ... | ... |
| Operator_H1 | Operator_A1 | GW1 (Operator_I1) |
| Operator_H1 | Operator_A1 | GW7 (Operator_I1) |
| Operator_H1 | Operator_A2 | GW2 (Operator_I2) |
| Operator_H1 | Operator_A3 | GW3 (Operator_I1) |
| Operator_H2 | Operator_A2 | GW2 (Operator_I2) |
| Operator_H2 | Operator_A2 | GW8 (Operator_I4) |
| Operator_H2 | Operator_A1 | GW4 (Operator_I3) |

| Registered Domain | Access Domain | Gateway Node (Intermediate Domain) |
|---|---|---|
| Operator_H1 | Operator_H1 | GW5 (Operator_H1) |
| Operator_H2 | Operator_H2 | GW6 (Operator_H2) |
| ... | ... | ... |

In the above example mapping M, if the registered domain identified in the domain name system query is Operator_H1, and the domain name system query is received from access domain Operator_A1, then the respective addresses of gateway nodes GW1 and GW7 (both in intermediate domain Operator_I1) are returned by the mapping M (it is common in DNS databases to return multiple choices in the query response, typically for fault tolerance or load balancing; it would typically be up to the node that sent the query to decide which to use; this could e.g. be done randomly, or some kind of priority could be added in the query response). On the other hand, if the registered domain identified in the domain name system query is Operator_H1, and the domain name system query is received from access domain Operator_A3, then the address of gateway node GW3 (in intermediate domain Operator_I1) is returned by the mapping M. If the registered domain identified in the domain name system query is Operator_H2, and the domain name system query is received from access domain Operator_A1, then the address of gateway node GW4 (in intermediate domain Operator_I3) is returned by the mapping M. If the registered domain identified in the domain name system query and the access domain from which the domain name system query is received are under control of the same operator Operator_H1 (e.g the access domain forms part of the registered domain), then the address of gateway node GW5 (in registered domain Operator_H1) is returned by the mapping M.

These mapping entries can be based on various factors. For example, the gateway node used in the mapping for a particular combination of registered domain and access domain may have been selected based on the proximity of the gateway node to one or both of the access domain and registered domain of the combination. Alternatively, or in addition, the gateway node used in the mapping for a particular combination of registered domain and access domain may have been selected based on routing cost between the gateway node and one or both of the access domain and registered domain of the combination. Alternatively, or in addition, the gateway node used in the mapping for a particular combination of registered domain and access domain may have been selected based on whether the access domain is associated with the registered domain. Alternatively, or in addition, the gateway node used in the mapping for a particular combination of registered domain and access domain may have been selected based on the existence of operating agreements between two or more of the access domain, the registered domain and the intermediate domain in which the gateway node is located.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. Any appended claims now or in future are to be interpreted as covering an operating program by itself, or as a record on a carrier, or as a signal, or in any other form.

Figure 7:
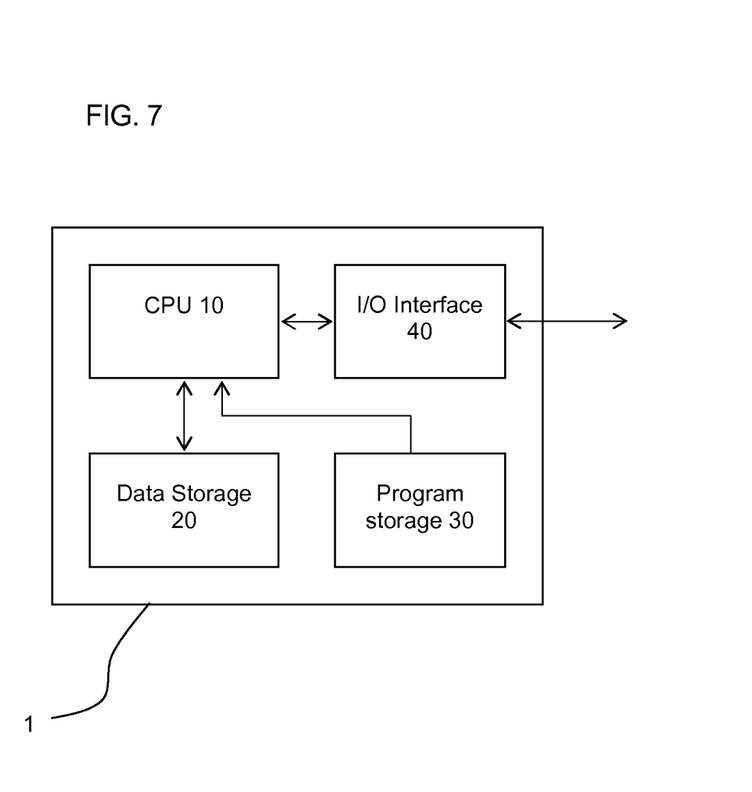
FIG. 7 is a schematic illustration of a node in which a method embodying the present invention can be implemented.

FIG. 7 is a schematic illustration of a node 1 in which a method embodying the present invention can be implemented. A computer program for controlling the node 1 to carry out a method embodying the present invention is stored in a program storage 30. Data used (e.g. the mapping M) during the performance of a method embodying the present invention is stored in a data storage 20. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which may comprise a transmitter for transmitting data to other nodes, as required. Likewise, the Input/Output (I/O) interface 40 may comprise a receiver for receiving data from other nodes, for example for use by the CPU 10.

The appended signaling diagrams can be considered not only to depict a series of messages exchanged and method steps performed by the various nodes, but also to depict apparatus for exchanging those messages or performing those method steps. In addition, for the sake of completeness, any message which is shown or described as being sent from node A to node B implicitly includes the step of node A sending the message as well as the step of node B receiving the message, and means at nodes A and B for performing those steps.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Likewise, an embodiment of the present invention is not restricted to a non-3GPP access network such as the BBF, but is applicable to any non-3GPP access network.

The invention claimed is:

1. A method of selecting a gateway node for a terminal which connects to its registered domain via an access domain and, in a predetermined scenario, an intermediate domain, the access domain having an associated domain name system which is arranged to return an address of the gateway node based on a domain name system query sent to it, and the method comprising using a first part of the domain name system query to identify the registered domain of the terminal to the domain name system and a second part of the domain name system query to indicate to the domain name system that it is to use a predetermined mapping at a local level to the domain name system to return the address of the gateway node based on the domain name system query, in which the second part of the domain name system query is a unique identifier to indicate an operation by the domain name system to access the predetermined mapping to identify the gateway node connecting the registered domain to the access domain, the predetermined mapping being a listing containing a plurality of registered domains and corresponding access domains which connect to the registered domains and the listing further containing at least one predetermined gateway node of a respective intermediate domain for each combination of registered domain listed and corresponding connecting access domain, to return the address of the gateway node in the intermediate domain based on the registered domain identified in the domain name system query and on the access domain connected by the terminal.

2. The method of claim 1, wherein the gateway node specified in the predetermined mapping for a particular combination of access domain and registered domain depends on proximity of the gateway node to one or both of the access domain and registered domain of the combination.

3. The method of claim 1, wherein the gateway node specified in the predetermined mapping for a particular combination of access domain and registered domain depends on routing cost between the gateway node and one or both of the access domain and registered domain of the combination.

4. The method of claim 1, wherein the gateway node specified in the predetermined mapping for a particular combination of access domain and registered domain depends on an existence of operating agreements between two or more of the access domain, the registered domain, and the intermediate domain in which the gateway node is located.

5. The method of claim 1, wherein the gateway node specified in the predetermined mapping for a particular combination of access domain and registered domain depends on whether the access domain is associated with the registered domain.

6. The method of claim 1, wherein the predetermined mapping is one which, when the domain name system is associated with the access domain that is not itself associated with the registered domain, returns an address of a gateway node in the intermediate domain which has an operating agreement with both the access domain and the registered domain, and which, when the domain name system is associated with the access domain that is itself associated with the registered domain, returns an address of a gateway node in the registered domain.

7. The method of claim 6, wherein the access domain is associated with the registered domain if it is in or forms part of the registered domain, and wherein the domain name system is associated with the access domain if it is in or forms part of the access domain or is used by the access domain.

8. The method of claim 7, wherein the method further comprises at least one of the registered domain comprising a Home Public Land Mobile Network (HPLMN), the intermediate domain comprising a Visited Public Land Mobile Network (VPLMN), and the domain name system query comprising a Fully Qualified Domain Name (FQDN).

9. The method of claim 1, wherein the predetermined mapping is a lookup table or database.

10. The method of claim 9, wherein the predetermined mapping is integrated into a remainder of the lookup table or database of the domain name system.

11. The method of claim 1, wherein the registered domain is a home domain.

12. The method of claim 1, wherein the predetermined scenario is a roaming scenario.

13. The method of claim 1, wherein the intermediate domain is a visited domain.

14. The method of claim 1, wherein the first part of the domain name system query comprises more than one element, which elements may be non-adjacent.

15. The method of claim 1, wherein the domain name system query comprises a third part identifying a type of the gateway node.

16. The method of claim 1, wherein the gateway node is a Packet Data Network (PDN) Gateway (PGW) node, or an evolved Packet Data Gateway (ePDG) node.

17. The method of claim 1, being performed at the terminal.

18. The method of claim 17, wherein using the first and second parts of the domain name system query comprises:
   constructing the domain name system query;
   sending the domain name system query to the domain name system; and
   receiving the address from the domain name system.

19. The method of claim 1, being performed at the domain name system (DNS).

20. The method of claim 19, wherein using the first and second parts of the domain name system query comprises:
   receiving the domain name system query from the terminal;
   looking up the address of the gateway node based on the received domain name system query; and
   sending the address to the terminal.

21. An apparatus for selecting a gateway node for a terminal which connects to its registered domain via an access domain and, in a predetermined scenario, an intermediate domain, the access domain having an associated domain name system which is arranged to return an address of the gateway node based on a domain name system query sent to it, the apparatus comprising:
   a processor; and
   a storage containing a program which, when executed by the processor, causes the apparatus to:
      use a first part of the domain name system query to identify the registered domain of the terminal to the domain name system and a second part of the domain name system query to indicate to the domain name system that it is to use a predetermined mapping at a local level to the domain name system to return the address of the gateway node based on the domain name system query, in which the second part of the domain name system query is a unique identifier to indicate an operation by the domain name system to access the predetermined mapping to identify the gateway node connecting the registered domain to the access domain, the predetermined mapping being a listing containing a plurality of registered domains and corresponding access domains which connect to the registered domains and the listing further containing at least one predetermined gateway node of a respective intermediate domain for each combination of registered domain listed and corresponding connecting access domain, to return the address of the gateway node in the intermediate domain based on the registered domain identified in the domain name system query and on the access domain connected by the terminal.

22. The apparatus of claim 21, wherein the apparatus comprises the domain name system (DNS).

23. The apparatus of claim 22, wherein the apparatus further comprises:
   a receiver arranged to receive the domain name system query from the terminal, wherein the program which, when executed by the processor, causes the apparatus to look up the address of the gateway node based on the received domain name system query; and a transmitter arranged to send the address to the terminal.

24. The apparatus of claim 21, wherein the apparatus comprises the terminal.

25. The apparatus of claim 24, wherein the program which, when executed by the processor, causes the apparatus to construct the domain name system query, and the apparatus further comprises:

a transmitter arranged to send the domain name system query to the domain name system; and a receiver arranged to receive the address from the domain name system.

26. A non-transitory computer-readable medium having computer instructions stored therein, which when executed by a processor, cause the processor to perform operations comprising:

querying for a gateway node for a terminal which connects to its registered domain via an access domain and, in a predetermined scenario, an intermediate domain, the access domain having an associated domain name system which is arranged to return an address of the gateway node based on a domain name system query sent to it; and using a first part of the domain name system query to identify the registered domain of the terminal to the domain name system and a second part of the domain name system query to indicate to the domain name system that it is to use a predetermined mapping at a local level to the domain name system to return the address of the gateway node based on the domain name system query, in which the second part of the domain name system query is a unique identifier to indicate an operation by the domain name system to access the predetermined mapping to identify the gateway node connecting the registered domain to the access domain, the predetermined mapping being a listing containing a plurality of registered domains and corresponding access domains which connect to the registered domains and the listing further containing at least one predetermined gateway node of a respective intermediate domain for each combination of registered domain listed and corresponding connecting access domain, to return the address of the gateway node in the intermediate domain based on the registered domain identified in the domain name system query and on the access domain connected by the terminal.

* * * * *